US011961958B2

(12) United States Patent
Collins et al.

(10) Patent No.: US 11,961,958 B2
(45) Date of Patent: Apr. 16, 2024

(54) 3D TEXTURED COMPOSITE SILICON ANODE AND FLUORINATED LITHIUM COMPOUND ELECTROCHEMICAL CELL

(71) Applicant: International Business Machines Corporation, Armonk, NY (US)

(72) Inventors: John Collins, Tarrytown, NY (US); Bucknell C. Webb, Ossining, NY (US); Paul S. Andry, Yorktown Heights, NY (US); Teodor Krassimirov Todorov, Yorktown Heights, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/440,961

(22) Filed: Jun. 13, 2019

(65) Prior Publication Data

US 2020/0395628 A1    Dec. 17, 2020

Related U.S. Application Data

(60) Provisional application No. 62/853,151, filed on May 27, 2019.

(51) Int. Cl.
*H01M 10/0525* (2010.01)
*C08K 3/04* (2006.01)
(Continued)

(52) U.S. Cl.
CPC .......... *H01M 10/0525* (2013.01); *C08K 3/04* (2013.01); *C08K 5/315* (2013.01); *C08L 67/04* (2013.01);
(Continued)

(58) Field of Classification Search
CPC ..... H01M 10/05–0562; H01M 10/0564–0565; H01M 4/13–1315;
(Continued)

(56) References Cited

U.S. PATENT DOCUMENTS 6,087,042 A    7/2000  Sugiyama et al.
6,495,283 B1   12/2002 Yoon et al.
(Continued)

FOREIGN PATENT DOCUMENTS

CN    109390632       * 2/2019 .......... H01M 10/058
DE    102015222048     5/2017
(Continued)

OTHER PUBLICATIONS

Machine translation of CN 109390632, originally published Feb. 26, 2019. (Year: 2019).*

(Continued)

*Primary Examiner* — Jonathan Crepeau
*Assistant Examiner* — Jacob Buchanan
(74) *Attorney, Agent, or Firm* — Daniel Morris; Otterstedt & Kammer PLLC

(57) ABSTRACT

A composition includes an electrode made of Lithium Manganese Oxyfluoride (LMOF). A single layer separator adheres to a surface of the electrode, is a dielectric that is conductive for Lithium ions but not electrons, and has top and bottom sides. A solid polymer electrolyte (SPE) saturates the electrode so that the LMOF is between 55 percent and 85 percent by mass of a composition of the LMOF electrode and the SPE is between 7.5 percent and 20 percent by mass of the composition of the LMOF electrode. The SPE saturates the separator so that the SPE resides both on the separator top and bottom sides so that the SPE residing on the separator top side contacts the surface. The LMOF exhibits X-Ray Diffraction spectrum peaks between twenty- (Continued)

two and twenty-four 2-theta degrees, between forty-eight and fifty 2-theta degrees, between fifty-four and fifty-six 2-theta degrees, and between fifty-six and fifty-eight 2-theta degrees.

16 Claims, 14 Drawing Sheets

(51) Int. Cl.
| | |
|---|---|
| C08K 5/315 | (2006.01) |
| C08L 67/04 | (2006.01) |
| C09J 179/02 | (2006.01) |
| H01M 4/02 | (2006.01) |
| H01M 4/1315 | (2010.01) |
| H01M 4/505 | (2010.01) |
| H01M 10/0565 | (2010.01) |

(52) U.S. Cl.
CPC ......... *C09J 179/02* (2013.01); *H01M 4/1315* (2013.01); *H01M 4/505* (2013.01); *H01M 10/0565* (2013.01); *C08K 2201/001* (2013.01); *C08K 2201/005* (2013.01); *C08L 2203/20* (2013.01); *H01M 2004/021* (2013.01); *H01M 2300/0082* (2013.01)

(58) Field of Classification Search
CPC ....... H01M 4/137–13915; H01M 4/50; H01M 4/505; H01M 50/40–497; H01M 4/02; H01M 4/388; C08K 3/04; C08K 5/315; C08L 67/04; C09J 179/02
See application file for complete search history.

(56) References Cited

U.S. PATENT DOCUMENTS

| | | | |
|---|---|---|---|
| 6,900,114 B2 | 5/2005 | Ohmi et al. | |
| 7,368,332 B2 | 5/2008 | Moriwaki et al. | |
| 7,718,319 B2 | 5/2010 | Manthiram et al. | |
| 8,637,186 B2 | 1/2014 | Kim et al. | |
| 8,846,551 B2 | 9/2014 | Gupta et al. | |
| 8,889,295 B2 | 11/2014 | Yushin et al. | |
| 9,142,833 B2 | 9/2015 | Tolbert et al. | |
| 10,581,109 B2 | 3/2020 | de Souza et al. | |
| 10,644,356 B2 | 5/2020 | de Souza et al. | |
| 10,777,842 B2 | 9/2020 | de Souza et al. | |
| 10,833,311 B2 | 11/2020 | de Souza et al. | |
| 10,833,356 B2 | 11/2020 | de Souza et al. | |
| 10,833,357 B2 | 11/2020 | de Souza et al. | |
| 11,233,288 B2 | 1/2022 | Collins et al. | |
| 11,245,134 B2 | 2/2022 | Collins et al. | |
| 11,322,787 B2 | 5/2022 | Collins et al. | |
| 2005/0100782 A1* | 5/2005 | Iijima | H01M 10/4235 429/246 |
| 2008/0050656 A1 | 2/2008 | Eisenbeiser | |
| 2010/0086854 A1* | 4/2010 | Kumar | H01M 4/505 429/231.95 |
| 2012/0244436 A1 | 9/2012 | Kerlau | |
| 2015/0004485 A1 | 1/2015 | Chen et al. | |
| 2017/0098823 A1 | 4/2017 | Yushin et al. | |
| 2018/0076452 A1* | 3/2018 | Sasaki | H01M 10/0562 |
| 2019/0115625 A1 | 4/2019 | Sadana et al. | |
| 2019/0214082 A1 | 7/2019 | Li et al. | |
| 2019/0237757 A1* | 8/2019 | Lee | H01M 4/525 |
| 2020/0006749 A1* | 1/2020 | Ikeuchi | C01G 45/1228 |
| 2020/0020943 A1* | 1/2020 | Natsui | C01G 51/50 |
| 2020/0194790 A1* | 6/2020 | Ceder | C01G 53/42 |
| 2020/0335626 A1 | 10/2020 | Collins et al. | |
| 2020/0403190 A1 | 12/2020 | Collins et al. | |
| 2021/0265606 A1 | 8/2021 | Dang et al. | |
| 2021/0399346 A1 | 12/2021 | Collins et al. | |
| 2022/0052316 A1 | 2/2022 | Collins et al. | |

FOREIGN PATENT DOCUMENTS

| | | | |
|---|---|---|---|
| WO | WO2011156419 A2 | 12/2011 | |
| WO | WO2017/093074 | 11/2016 | |
| WO | WO-2018163518 A1 * | 9/2018 | ......... C01G 45/1228 |
| WO | WO-2018164455 A1 * | 9/2018 | ......... H01M 4/0404 |
| WO | WO2019077426 | 4/2019 | |
| WO | WO2020008285 A1 | 1/2020 | |

OTHER PUBLICATIONS

Anodes for Li-Ion Batteries Basedon p-Si with Self-Organized Macropores; N. E. Preobrazhenskiy*, E. V. Astrova, S. I. Pavlov, V. B. Voronkov, A. M. Rumyantsev, and V. V. Zhdanov; ISSN 1063-7826, Semiconductors, 2017, vol. 51, No. 1, pp. 78-87. © Pleiades Publishing, Ltd., 2017. Original Russian Text © N.E. Preobrazhenskiy, E.V. Astrova, S.I. Pavlov, V.B. Voronkov, A.M. Rumyantsev, V.V. Zhdanov, 2017, published in Fizika i Tekhnika Poluprovodnikov, 2017, vol. 51, No. 1, pp. 79-88.

Freestanding Macroporous Silicon and Pyrolyzed Polyacrylonitrile As a Composite Anode for Lithium ion Batteries; Madhuri Thakur, Roderick B. Pernites, Naoki Nitta, Mark Isaacson, Steven L. Sinsabaugh, Michael S. Wong, and Sibani Lisa Biswal; Chemistry of Materials; pubs.acs.org/cm.

Lithium manganese oxyfluoride as a new cathode material exhibiting oxygen redox; Robert House et al., Royal Society of Chemistry, 2013, 00, 1-3.

Lithium manganese oxyfluoride as a new cathode mateial exhibiting oxygen redox- Supplementary Information; Robert 4 House, et al.; The Royal Society of Chemistry 2018, Electronic Supplementary Material (ESI) for Energy & Environmental Science.

U.S. Appl. No. 17/366,521, filed Jul. 2, 2021.

* cited by examiner

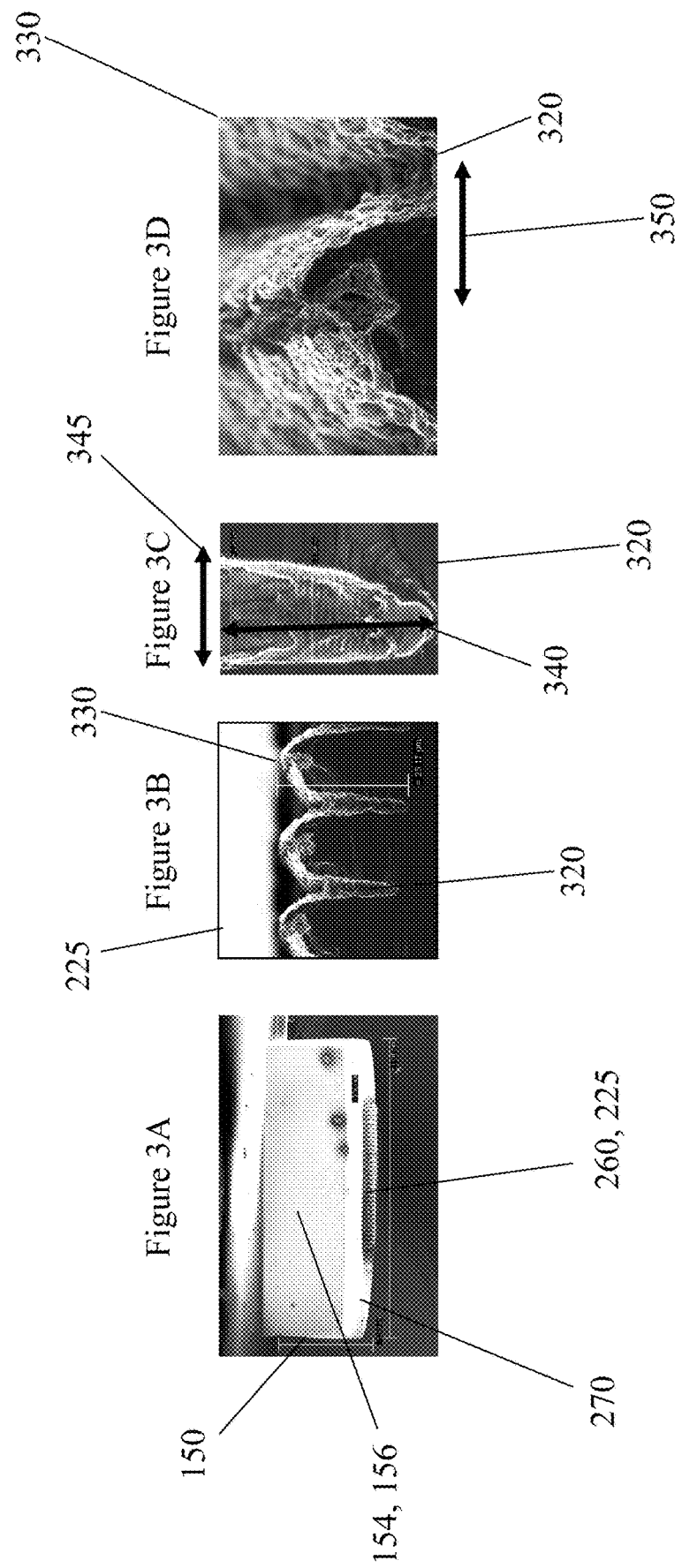

3D TEXTURED COMPOSITE SILICON ANODE AND FLUORINATED LITHIUM COMPOUND ELECTROCHEMICAL CELL

BACKGROUND

The present invention relates to energy storage device. More specifically, the invention relates to improved energy storage devices by texturing battery components, e.g. silicon, materials with laser ablation.

The integration of energy storage devices, e.g. batteries, in microprocessor and memory chips is a significant requirement for the IoT (Internet of Things) devices and other applications. In addition to IoT applications, emerging applications requiring these on-board next generation energy storage devices include mobile devices; sensory equipment; and autonomous environmental, biological, and social functioning machines. Common examples of such functional devices are smart, dust and/or biomedical sensory/medication-delivery devices. Additionally, most or all solid-state energy storage devices will progressively integrate lithium metal electrode material into its overall cell structure due to lithium metal's extremely high theoretical specific capacity (3860 mAh/g.)

Over the next generation, as human controlled and autonomous devices increasingly become miniaturized, total energy consumption requirements for electronic devices will decrease. Power consumption is expected to be lower than 1 Watt for these devices. However, because of device miniaturization, the energy storage devices providing device power will need to be miniaturized as well, sometimes be embedded in CMOS circuits, and will need high energy and power density.

Despite the high energy capacity of lithium energy storage devices, e.g. lithium batteries, there is a need to improve the energy capacity of these devices as the demand for smaller devices increases. In addition, there is a need to manufacture these battery structures using commonly known manufacturing process to mass produce high capacity energy storage devices to lower cost.

SUMMARY

According to an embodiment of the present invention there is a cathode of an energy storage device. The cathode is made of Lithium Manganese Oxyfluoride (LMOF), with the approximate stoichiometry $Li_2MnO_2F$. In some embodiments, the cathode is made of Lithium Manganese Oxyfluoride (LMOF), $Li_2MnO_2F$ combined with a solid polymer electrolyte (SPE). Other materials such as conductive material and binders can be included in the cathode. Methods of making are disclosed.

According to an embodiment of the present invention there is a composition of matter. The composition is made of Lithium Manganese Oxyfluoride (LMOF), $Li_2MnO_2F$ combined with a solid polymer electrolyte (SPE). Other materials such as conductive material and binders can be included in the composition. Methods of making are disclosed. The composition can be used as a cathode in an energy storage device.

An energy storage device, e.g. a battery, is disclosed. The battery has a silicon (Si) substrate with one or more trenches. Each of the trenches has a trench bottom area with a textured active surface. In some embodiments, the textured active area is created by laser ablation. An anode is disposed on the textured active surface. An electrolyte is disposed on the anode. A cathode is disposed on the electrolyte. In some embodiments, a galvanic cycling causes the anode, electrolyte, and cathode materials to transform into battery internals that are used during normal operation of the device.

BRIEF DESCRIPTION OF THE DRAWINGS

FIG. 3A is a micrograph showing a cross section elevation of a trench showing an active surface of the trench bottom area where the active surface has a textured surface.

FIG. 3B is a micrograph magnification of FIG. 3A showing the textured surface.

FIG. 3C is a micrograph magnification of FIG. 3B showing a valley with a valley depth.

FIG. 3D is a micrograph magnification of FIG. 3B showing a valley, a hill, and a pitch.

DETAILED DESCRIPTION

Figure 1:
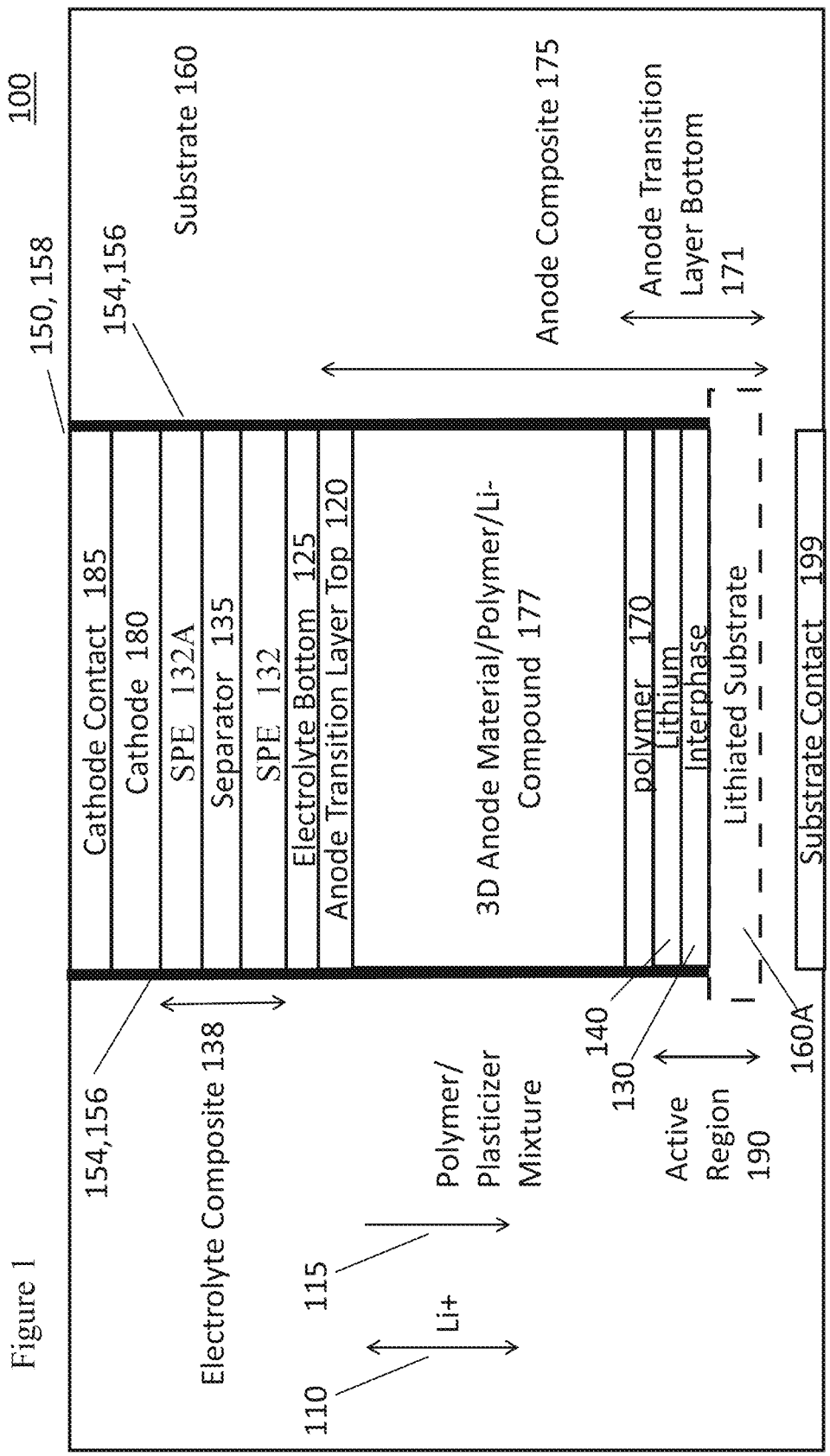
FIG. 1 is a block diagram of one preferred structure of the present invention, after galvanostatic current cycling is applied, showing a novel composite anode and a novel composite electrolyte.

With reference now to FIG. 1, FIG. 1 is a block diagram of one novel, example structure 100 of an energy storage device, e.g. a lithium battery. The structure 100 comprises a novel composite anode 175 and novel electrolyte composite 138.

The electrolyte composite 138 has a separator 135 centered within and saturated by solid polymer electrolyte (SPE) 132. 132 The SPE 132 is on either side of the separator 135, e.g. a top layer of the SPE 132A interfaces with the cathode 180 on a top side of the separator 135 and a bottom layer of the SPE 132 interfaces with an electrolyte bottom 125 and/or anode transition layer top 120 on a bottom side of the separator 135. In some embodiments during manufacturing, an SPE layer 132A adheres to the bottom of the cathode 180 before the cathode is assembled into a trench 150.

The structure 100 comprises a trench 150, e.g. a trench cavity 158 within a substrate 160. Insulating layers (154, 156) and a bi-layer (130, 140) contain the structure 100 internals, e.g. anode composite 175, electrolyte composite 138, and cathode 180, within the trench 150. In this non-limiting example embodiment, all the structure 100 internals are within the trench 150 (trench cavity 158).

Exterior electrical connections to the structure 100 are made through a cathode contact 185 and substrate contact 199.

As a result of initial material selection, placement, and structure and the application of an initial galvanostatic current cycling, movement of materials like Lithium ions, Li+, 110 and polymers/plasticizers mixtures 115 cause dynamic electrochemical and physical changes in situ in the trench cavity 158 that create new compositions and structures that result in the final operational structure 100. The anode composite 175 and the electrolyte composite 138 are two of these new compositions and structures that enable the enhanced performance of the battery structure 100.

During the initial galvanostatic current cycling, Lithium ions initially move due to a potential difference and high conductivity of the selected materials to uniformly and fully saturate the substrate 160 with Lithium ions. As electrons are introduced through the substrate contact 199 and taken from the silicon atoms in the substrate 160, a Lithium metal layer 140 and an interphase layer 130 start forming. The Lithium metal layer 140 eventually inhibits relatively high magnitudes of Lithium ions from penetrating or leaving the substrate 160, particularly the lithiated regions of the substrate 160A. The bi-layer (130, 140) helps contain and isolate the battery internals during any mechanical or volume change due to lithiation/de-lithiation of the lithiated substrate 160A or plating and stripping from the Lithium metal layer 140. Lithium ions that move 110 through the structure 100 are provided and accumulated in the formed Lithium metal layer 140 therefore reducing the change in lithium ion concentration in the lithiated substrate 160A and hence reducing mechanical stress in the substrate 160—enabling a reversibly sustainable novel energy storage device.

Also, due to the initial material selection and placement and the novel processes of this structure 100, materials, e.g. polymers and Li-ions, move through the structure 100 during the galvanic cycling to form the composite anode 175 and electrolyte 138.

As the bi-layer (130, 140) forms, a polymer settles above the lithium metal layer 140 and/or chemically and physically adheres with a conducting Li-salt containing polymer, e.g. Polyaniline (PANI) mixed with Lithium bis(trifluoromethanesulfonyl)imide (LiTFSI), material to form a novel conductive polymer adhesive layer 170. In an embodiment, the conductive polymer adhesive layer 170 contains PANI, Lithium based salt(s), e.g., LiTFSI and conductive polymers/plasticizers, e.g. Succinonitrile (SN) that migrated from the electrolyte during the formation of the bi-layer (130, 140). The Li-salt containing polymers in the conductive polymer adhesive layer 170 create a high ionic conductive region that reduces the internal resistance of the structure 100 while providing good adhesion between the transformed region of the central anode structure 177 and the active region 190.

Together the lithiated substrate 160A, bi-layer (130, 140), and the conductive polymer adhesion layer 170 comprise an anode transition layer bottom 171 which electrically, chemically, and physically transitions from more independently adhered layers (Active Region 190+polymer 170+anode material 177) to a lower impedance anode composite 175 which is composed of the precursor 3D textured anode material, e.g. graphite, and polymer electrolyte of homogenous unitary construction due to the electrochemically induced intermixing of the anode material 177 and polymer material 170. Therefore, higher adhesion and lower charge transferring impedance is enabled between the polymer material 170, bi-layer (130, 140), and lithiated substrate 160A to the silicon substrate 160 material.

In addition, due to the migration of lithium ions 110 and polymer/plasticizer mixture 115 the central anode structure 177 is transformed into a composite structure of precursor anode material, e.g. graphite, polymer/plasticizer and lithiated compounds.

Between the central anode structure 177 and the electrolyte 132, two transition layers form: a polymer/plasticizer and electrolyte layer 125 which is an electrolyte bottom region 125 and a polymer/plasticizer/anode/lithium compound region 120 or an anode transition layer top 120. These two layers also form during the galvanostatic current cycling as selected materials move and combine.

The anode transition layer top 120 comprises precursor anode material, e.g. graphite, and polymer/plasticizer that migrated into the top of the anode from the electrolyte 138. In preferred embodiments, the polymer includes polycaprolactone (PCl) and the plasticizer includes succinonitrile (SN). Lithium salts, e.g. LiTFSI may also appear in the anode transition layer top 120. The composition of the anode transition layer top 120 creates a more conductive structure which reduces the battery internal resistance. In conjunction with the electrolyte bottom 125, the anode transition top 120 creates a strong adhesion between the anode composition 175 and the electrolyte composition 138, thereby even further reducing impedance due to charge transfer throughout the cell.

As mentioned, due to the selection and placement of materials and structures and after the galvanostatic current cycling, the anode is transformed in situ into a anode composite 175 of several different regions all chemically connected to one another and chemically and structurally integrated to form a unified composite—thereby enabling low impedance to desired ion movement through the cell as well as low resistance to electrical flow through desired areas or materials (e.g. graphite material). The regions of the anode composite 175 include the lithiated substrate 160A, the interphase 130, the lithium metal layer 140 (that grows and shrinks during charge and discharge cycles), conductive polymer adhesion layer 170, central anode structure 177, and the anode transition layer top 120.

In addition, the electrolyte composition 138 is created comprising the electrolyte bottom 125, electrolyte 132, a separator material (e.g. a fabric-like inter-woven layer material like polyacrylnitrile, PAN) and an electrolyte top (above the separator and in contact with the cathode material). The electrolyte 132 is formed as explained above. However, during current cycling the polymer (e.g., PCl) and Lithium conducting plasticizer (e.g., SN) migrate throughout the cell in, vertically, an up or down direction as current is applied to the full energy storage device. Hence the mobility of these SPE components enables a higher saturation of the anode material 177, thereby further contributing to the formation of the Anode Composite 175, yet in addition, the electrochemical mobility of these materials with Li-ion movement throughout the cell, creates a well-integrated, void free and low impedance regions designated as the electrolyte bottom 125 and anode transition layer top 120—which also contributes greatly to the reversibly sustainable high performance of the In-Silicon energy storage device.

A separator layer 135 is saturated with the Electrolyte 132 and the Cathode 180. In some embodiments, the separator 135 adheres to the cathode 180 surface prior to saturating the separator 135 with ion-conductive material 132. Once the separator material is saturated, solid polymer electrolyte material resides on both the top and bottom sides of the separator—thereby contacting the material both above (e.g., cathode) and below (e.g., SPE) the separator, where the separator resides within the solid polymer electrolyte bulk.

The separator 135 acts as a dielectric—but, in addition and critically, the separator 135 is a dielectric which allows for ions (Li-ions) to flow through it 135, but not electrons. If electrons were able to flow through the center region of the cell, then the cell efficiency would decrease proportionally with electrical (electron) conductivity of the separator. In the case of Lithium batteries, dendrites may form due to high separator electrical (electron) conductivity, creating the hazard of separator puncture and electrical connection between the two electrodes—thereby disabling the cell via short circuiting of the cell.

In the present invention, the separator (PAN) is a woven fabric-like polymer material which is not conductive to electrons. However, because it is an interwoven, fabric like material, it can be easily saturated with the polymer electrolyte (PCl/SN). This saturation means that there is complete physical/chemically and therefore ionic transport through the separator 135. In a preferred embodiment, the separator 135 is a polymer electrolyte saturated separator 135. In a preferred embodiment, the electrolyte 130 is a SPE structure, described above, where there is polymer electrolyte (PCl) above, in the middle of and below the separator 135 material.

While the description, of FIG. 1 discloses a novel embodiment of an energy storage device, the inventions further disclosed herein are not limited to structure 100 or to structures in situ but are intended to be used in any general energy storage structure.

Figure 2:
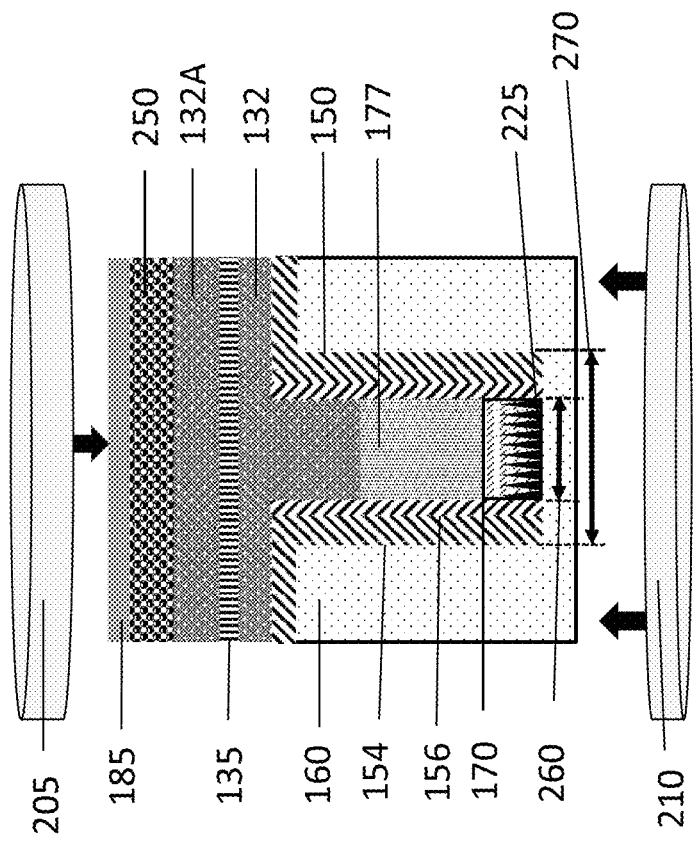
FIG. 2 is a diagram of an alternate novel battery structure.

FIG. 2 is a diagram of an alternate novel battery structure 200 with one or more of the inventive features disclosed.

The structure 200, as an example, is not totally in situ. The cathode contact 185, separator 135, and electrolyte 132 are outside of the trench 150 in this non-limiting example.

For clarity, structure 200 does not show the substrate 160, lithiated substrate region 160A, interphase layer 130, or the lithium metal layer 140 of the anode transition layer bottom 171 in order to more clearly show a novel textured bottom 225 of the anode transition layer bottom 171.

Structure 200 is partially encapsulated in the trench 150 of the substrate 160. A first liner 154 and an optional second liner 156 covers the walls of the trench 150. The first 154 and second 156 liners are made of a dielectric, electrically insulating material like Silicon Dioxide ($SiO_2$) or Silicon Nitride (SiN) that are deposited by known methods.

The liners (154, 156) do not cover the active surface 260 of the trench bottom area 270. The active surface 260 and the trench bottom area 270 are the bottom area where the trench 150 initially interfaces with the substrate 160 before galvanic cycling causes the transformations at these surfaces to form the lithiated substrate region 160A, interphase layer 130, or the lithium metal layer 140 of the anode transition layer bottom 171 (not shown).

In one novel feature of this, invention, the active surface 260 is texturized as described below before galvanic cycling. In some embodiments, the active surface 260 is 500 microns by 500 microns and the trench bottom area 270 is 1 $mm^2$. In other embodiments, the active surface 260 area is approximately the area of the trench bottom, +/−5%. However, these dimensions are scalable using known methods and other areas are envisioned.

In some embodiments the anode composite 175 will include the anode material/polymer/plasticizer/Li compounds 177 along with the polymer (e.g., LTFSI-PANI mixture) 170, Lithium metal 140 and Si-based interphase 130 layers, described in FIG. 1. However, other anode compositions 177, including those known in the art are envisioned.

The conductive adhesive region 170 is shown as well, as an embodiment. However, other embodiments, including the absence of the conductive adhesive region 170 are envisioned.

Structure 200 has an electrolyte layer 132 with a separator layer 135. In some embodiments, the electrolyte layer 132 is a solid polymer electrolyte (SPE), for example, as described in FIG. 1. However, any electrolyte material would function in the structure 200.

The layer 132A shows one embodiment of the electrolyte layer 132 where the electrolyte saturates through the separator layer 135 and forms layers (132, 132A) on either side of the separator layer 135.

A novel cathode 250, as described below, can be used in structure 200. However, any known cathode 250 is envisioned.

The cathode 250 is electrically connected to a cathode contact 185 which is a conductive material, e.g. a metal like Aluminum (Al). In some embodiments, the cathode contact 185 is connected to another top outside contact 205 like a coin cell casing.

In some embodiments, a bottom outside contact 210, like a coin cell casing is attached to the substrate 160.

FIG. 3A is a micrograph showing a cross section elevation of a trench 150 (at a slight angle to the camera) showing the active surface 260 of the trench bottom area 270 where the active surface 260 has a textured surface 225 made by a laser ablation. The view is looking into a side (154, 156) of the trench 150.

FIG. 3B is a micrograph magnification of FIG. 3A showing the textured surface 225 made of multiple "valleys" 320 and "hills" 330 created by a raster scan of a laser that ablates the active surface 260. The laser ablation changes the relatively flat surface of the active surface 260 into a textured, three-dimensional surface 225 with a greater surface area.

FIG. 3C is a micrograph magnification of FIG. 3B showing a valley 320 with a valley depth 340. The valley opening 345 is a measure of the opening at the top of the valley 320. An aspect ratio can be defined as the ratio of the opening measurement 345 to the valley depth measurement 340. In some embodiments, the valley depth 340 is between 1 micron and 50 microns; the valley opening is between 0.5 microns and 30 microns; and the aspect ratio is between 1 and 10.

FIG. 3D is a micrograph magnification of FIG. 3B showing a valley 320 and a hill 330 with a valley depth 340. The distance 350 between the peak of the hill 330 and valley 320 is a measure of pitch 350 of the raster of the laser scanning the active surface 260. Pitch 350 is a measure of the number of valleys 320 (or hills 330) in a given distance perpendicular to the direction of the valleys 320.

By texturing the active surface 260 before deposition of the remaining anode material, the surface area of the active surface 260 is increased. This results in better conductivity, adhesion, and/or increased charge storage/hosting sites between the substrate 160 and anode 177. This enables more electrons and lithium ions to flow through this interfacial area, compared to the non-textured starting material, resulting in increased battery capacity via increased Lithium-based charge loading.

It is also expected that the increase active surface 260 area will increase the bonding strength between the anode transition layer bottom 171 and the anode 177 because of the increase contact area for the adhesive polymer 170 at the interface between these regions.

The energy level of the laser and the laser scan rate (and/or dwell time over a location) determines the valley depth 340 at a particular location on the active surface 260. The pitch of the raster determines the pitch 350 of the textured surface 225. The opening size 345 is determined by the time exposure to the laser, the laser power, and the spot size of the laser.

Figure 4C:
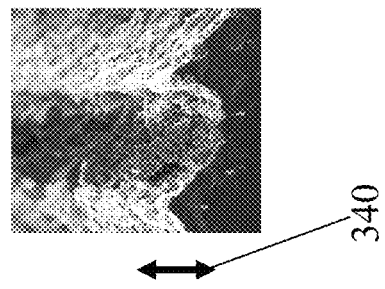
FIG. 4C is a micrograph magnification of FIG. 4A showing the alternative textured surface with a shallower depth.
Figure 4B:
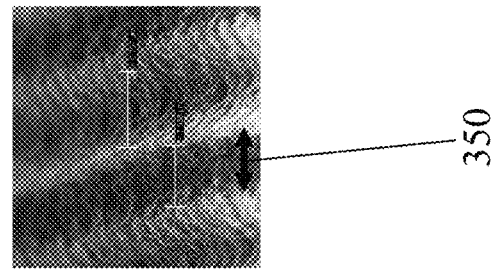
FIG. 4B is a micrograph magnification of FIG. 4A showing the alternative textured surface with a higher pitch.
Figure 4A:
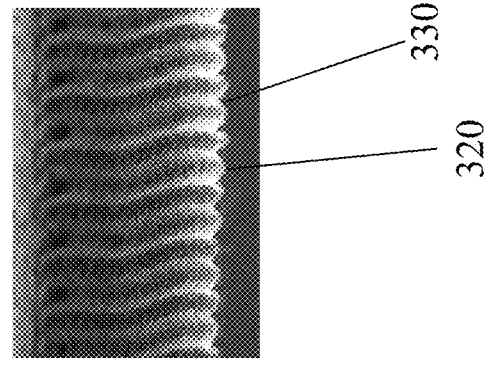
FIG. 4A is a micrograph showing an alternative textured surface.

FIG. 4A is a micrograph showing an alternative textured surface 225. The view of FIG. 4A is the same as than that of FIG. 3A but the magnification is lower so a greater number of valleys 320 and hills 330 are shown.

FIG. 4B is a micrograph magnification of FIG. 4A showing the alternative textured surface 225 with a higher pitch 350.

FIG. 4C is a micrograph magnification of FIG. 4A showing the alternative textured surface 225 with a shallower depth 340 than that of FIG. 3C.

The sequence of micrographs in FIGS. 3A, 3B, 3C, 3D, 4A, 4B, and 4C show some of the trade-offs involved in altering the 3D surface area of the textured surface 225.

In the case of FIG. 3C there is a deeper depth 340 with a higher surface area, however the substrate 160 is weakened because the notch stresses caused by the depth 340 increases.

FIG. 4B shows an increased textured surface 225 due to a higher pitch 350 but requires more raster scans of the laser than the structure in FIG. 3D.

A deeper depth 340 means higher surface area and typically higher aspect ratio which yields higher capacity/rate/performance. However, it is observed that the higher the aspect ratio typically, the less robust the structure so the structure doesn't last as long under cycling conditions (especially in high power applications).

In some embodiments, the pitch can be less than 500 nm and as high as 75 microns. In other embodiments, the pitch is between 500 nm to 5 microns. In some embodiments, the depth 340 is below 100 microns but deeper depths are possible depending on the application. In some embodiments, the depth is between 10 to 50 microns.

The aspect ratio of the 3D patterned material is proportional to the theoretical volumetric energy storage capability (energy density) or how much charge is stored in a given volume of the device.

Figure 5:
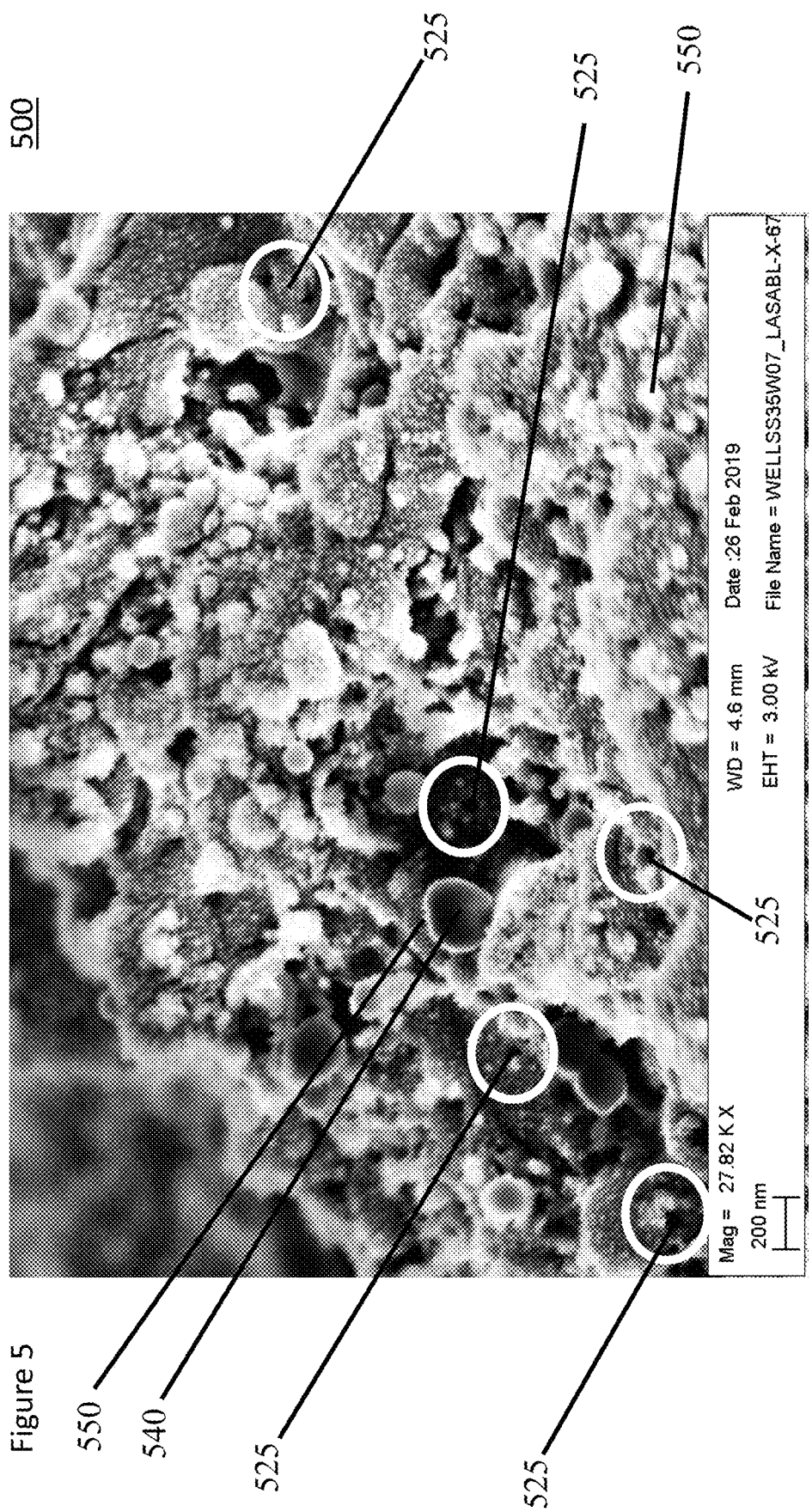
FIG. 5 is a micrograph of a textured surface made by ablating an active surface.

FIG. 5 is a micrograph of a textured surface 225 made by ablating an active surface 260 where the resulting structure 500 has Silicon Dioxide ($SiO_2$) surface layers and additional pores in the structure 500.

The regions on structure 500 identified by "white circles" contain pores in the substrate 160 that are believed to be created by the laser ablation in addition to the valleys 320 and hills 330. Five example pores are designated by reference number 525. Inspection of this and other micrographs indicate that the pores 525 are column like in structure with the axis of the column being in the direction of the laser during ablation. The pores primarily occur within the valleys 320 ablated by the laser. The silicon substrates used in the creation of 3D texturing and pore formation were high, e.g. boron, doped (10e19) p+ type silicon wafers.

In general, the pores have a diameter between 5 to 50 nanometers (nm) and create an increased surface area of the active surface 260.

It is noted that alternative methods (other than laser ablation) of forming a textured surface 225 also enhance device performance.

Structure 500 also shows the formation of Silicon Dioxide ($SiO_2$) as a result of the ablation process. For example, region 540 is believed to be part of the silicon substrate 160 with a layer 550 of $SiO_2$ deposited on the surface. The oxide layer 550 is between 5 nm to 15 nm thick. The "white colored" regions on structure 500 are $SiO_2$ layers 550.

Energy storage devices, e.g. structures 100 and 200, that retained significant thickness of the $SiO_2$ layers 550 after ablation showed reduced performance. For example, devices (e.g. 100, 200) with retained $SiO_2$ layers had a pre-galvanic cycling open circuit voltage (OCV) below 10 milliVolts (mV) even with the enhanced cathode described below. Many of those devices without the enhanced, novel cathode had OCV below 2 mV.

Since $SiO_2$ is an electrical insulator, the $SiO_2$ layer 550 should be removed to improve device performance.

The $SiO_2$ layer 550 is removed by a wet etch process, for example exposing the textured surface to a solution of Hydrofluoric Acid (HF) or Hydrochloric Acid (HCl). However, it was discovered the concentration of the wet etch solution affected device performance. A too low concentration did not remove the insulating $SiO_2$ layer and did not improve OCV. However, a too high concentration removed the $SiO_2$ layer but also removed the texturing (and increased surface area) of the textured surface 225. This resulted in a lower OCV, e.g. below 5 mV.

A wet etch solution of concentrated HF (49%) in a concentration of less than 10 percent by volume for less than 60 seconds resulting in an improved OCV, on the order of 20 mV to 400 mV. A more preferred wet etch uses a HF concentration of 3 to 5 percent for 10 seconds to 30 seconds.

Figure 6:
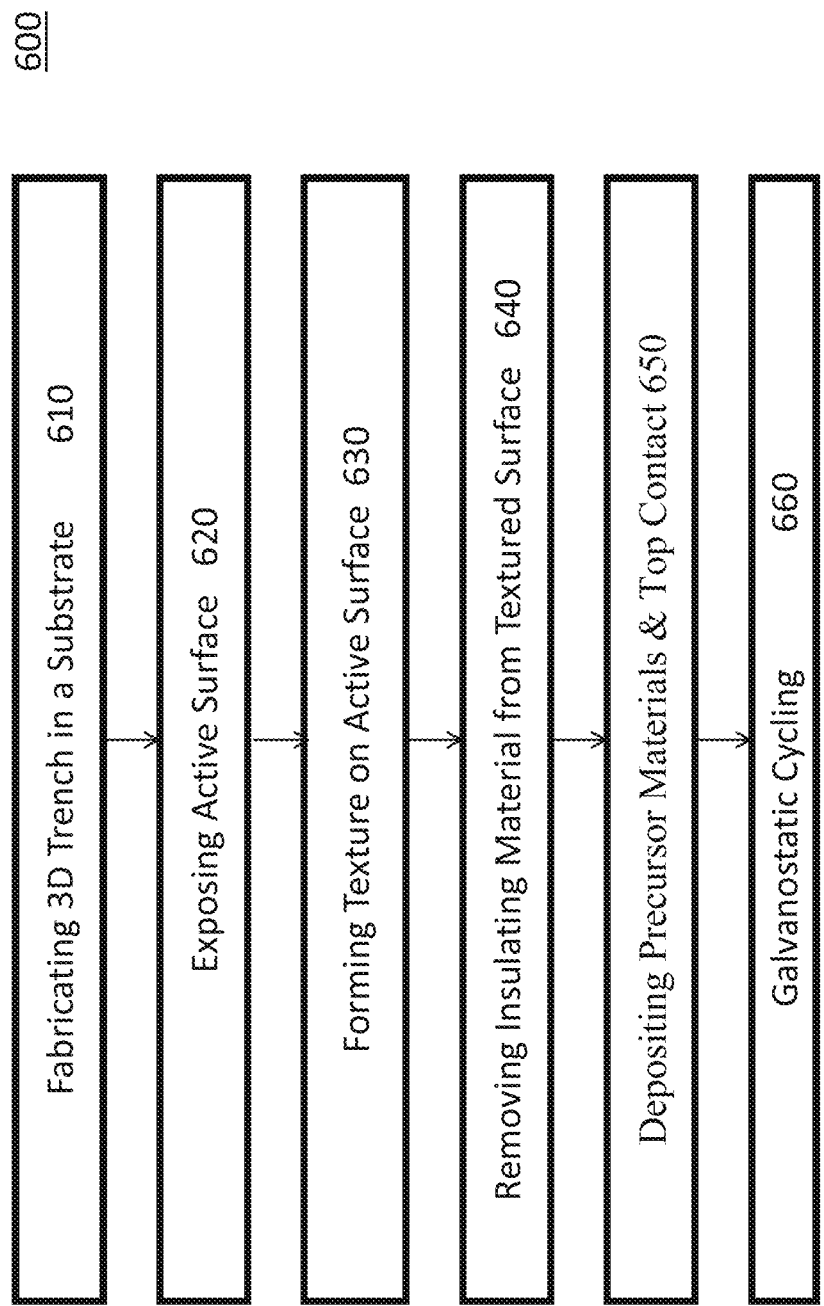
FIG. 6 is a flow chart showing a method of forming a textured surface.

FIG. 6 is a flow chart showing a method 600 of forming a textured surface 225 on the active surface 260 of an energy storage device, e.g. structures 100 and 200.

The process 600 begins by creating a trench 160 in a substrate 160 in step 610. One or more liners (154, 156) are deposited in the trench 150.

In step 620 of process 600 the bottom portions of the liners (154, 156) are removed exposing the active surface 260, e.g. by standard etch processes like reactive ion etching (RIE).

In step 630 of the process 600 the active surface 260 is textured to create a textured surface 225 as described above.

In step 640 of the process 600 the insulating surface layer, e.g. SiO2, is removed from the textured surface 225. In some embodiments, a wet etch with a concentration and time of exposure is used to remove the insulating surface layer 550 without removing the textured surface 225.

In step 650 of the process 600 the battery precursor materials are deposited and the top contact is connected to the full cell system either using the methods and materials in the prior art and/or those as disclosed herein.

In step 660 of the process 600 a galvanic cycling 660 is performed. In this step, current is forced through the battery (galvanostatic cell cycling), cycling between a lower and a higher cell voltage as well as between a lower and higher applied current. During this cycling operation, the precursor materials change due to migration of lithium ions and electrons through the structure forming the regions described in the description of FIG. 1.

Another novel aspect of the present energy storage device is a high capacity cathode (180, 250). The cathode (180, 250) is made with Lithium Manganese Oxyfluoride (LMOF), with an approximate stoichiometry of $Li_2MnO_2F$, in combination with a solid polymer electrolyte (SPE) material and conductive additives, and binders.

This novel composition of matter used as a cathode (180, 250) that has a low material impedance, a low in circuit impedance, good electrical characteristics when used with a SPE, and a good adhesion to device components. The composition has a higher concentration of lithium (two lithium atoms per molecule) and therefore enables a higher device voltage at a given current and a higher current capacity.

Figure 7:
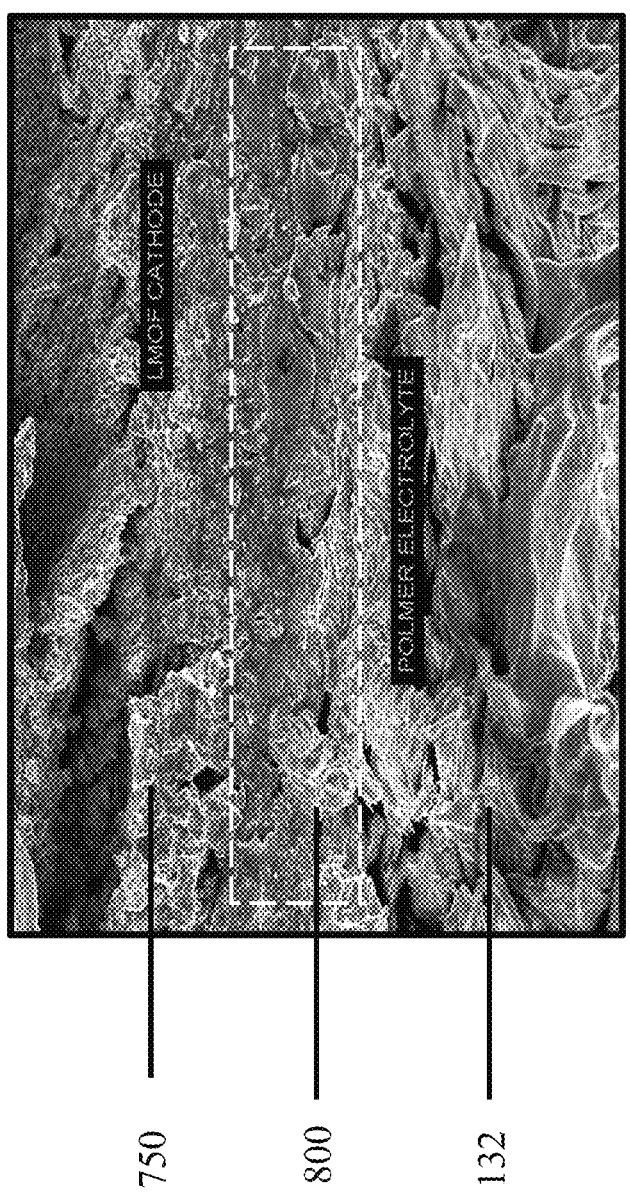
FIG. 7 is a micrograph of a structure showing a cathode and a solid polymer electrolyte interface.

FIG. 7 is a micrograph of a structure 700 showing the cathode 750, i.e. (180, 250), an SPE 132 and an interface layer 800 (within the dotted, white line box) between the cathode 750 and SPE 132. The lack of large voids in the interface layer 800 shows the excellent interlayer adhesion between the cathode 750 and SPE 132.

The improved interlayer adhesion enables a novel seamless integration with a LMOF cathode 750 and a solid electrolyte, e.g. SPE 132. There is a high polymer saturation and cathode 750 integration that enables a low interfacial impedance and high device performance. The cathode 750 composition of matter enables this integration with any energy storage device using a solid electrolyte like SPE 132, even in in-silicon structures like structure 100.

Figure 8:
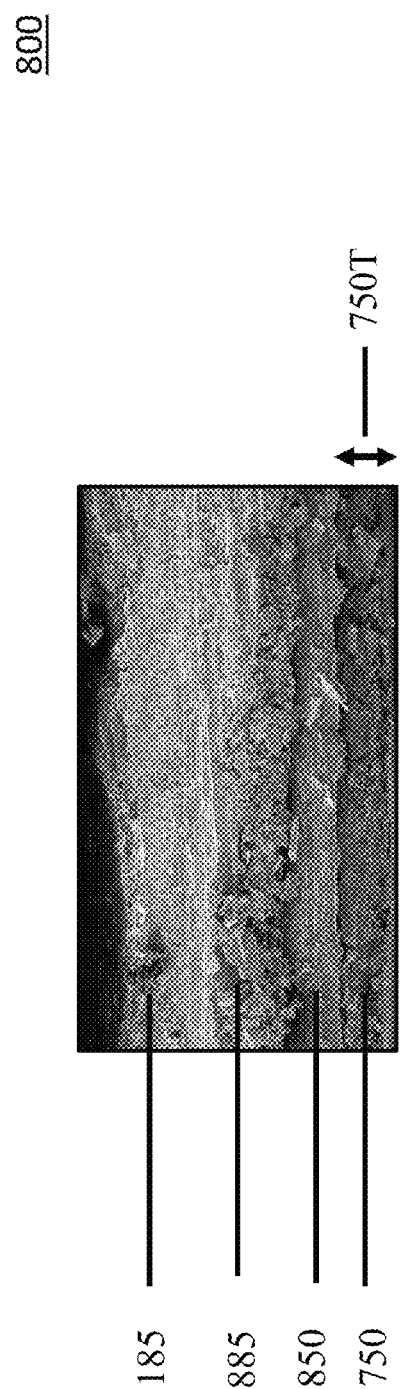
FIG. 8 is a micrograph an LMOF cathode including related structures that enable electrical connection outside the storage device.

FIG. 8 is a micrograph the LMOF cathode 750 including related structures 800 that enable electrical connection outside the storage device.

Layer 750 is the LMOF cathode 750 made of the novel composition of matter 750. The LMOF cathode material 750 has a thickness 750T between 20 microns and 100 microns. In some embodiments, the thickness is about 38 microns but other thicknesses are possible depending on the application.

In some embodiments, the LMOF cathode material 750 is deposited on a conductive layer, e.g. a laminated conductive foil 850.

The shiny consistency of the LMOF cathode material 750 allows application on the conductive layer 850 by any number of methods including but not limited to: pouring, pipette, thin coat, lamination on a heated sheet (e.g. with a doctor blade) and dropping on the foil or other substrate or electrolyte. Temperature and pressure can be controlled to get the desired thickness and adhesion. Using similar methods, the LMOF cathode material 750 can be deposited in a trench 150.

Layer 885 is a conductive epoxy material like silver epoxy that electrically and physically attaches a cathode contact 185 to the conductive foil 850 establishing an electrical contact from the LMOF cathode 750 to electrical connections external to the device.

Figures 9A, 9B:
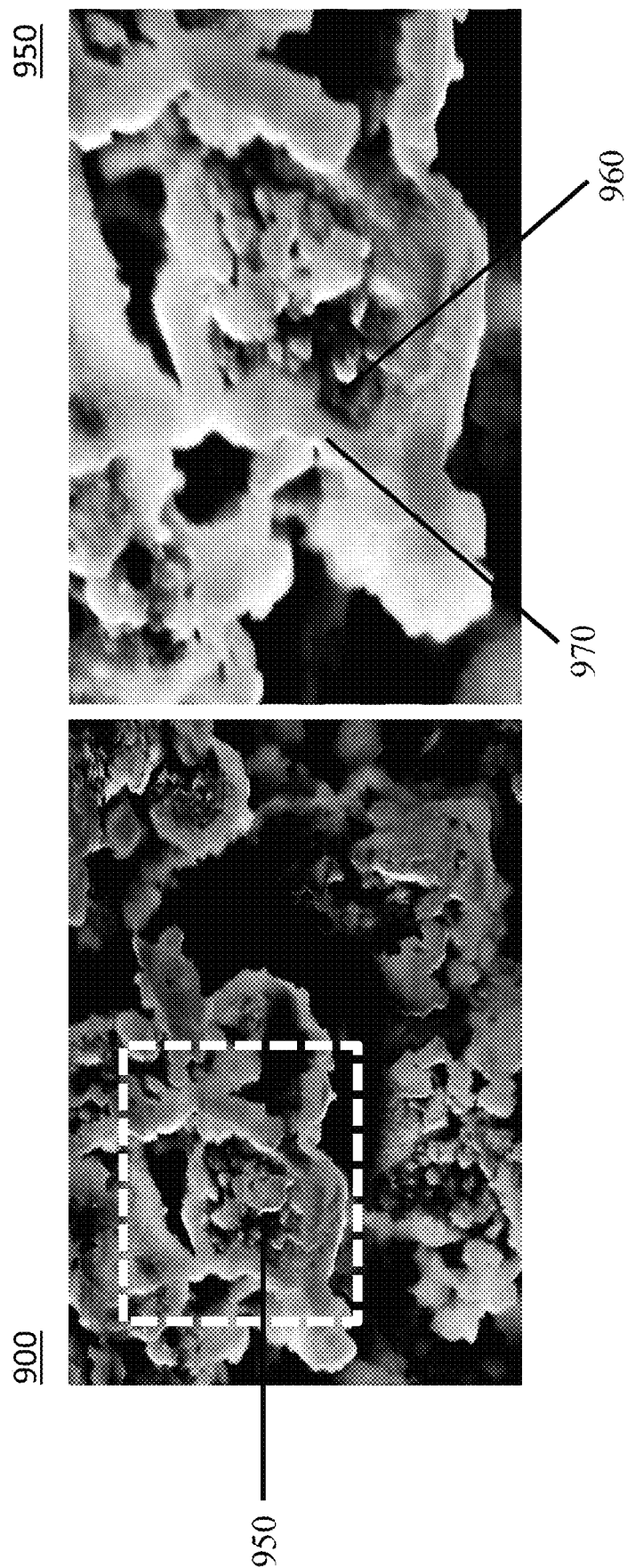
FIG. 9A is a micrograph showing the formation of the LMOF cathode material saturated with a solid polymer electrolyte (SPE).
FIG. 9B is a micrograph showing a magnified region of FIG. 9A with the LMOF cathode material highly saturated with SPE material.

FIG. 9A is a micrograph 900 showing the formation of the LMOF cathode material 750 with a solid polymer electrolyte (SPE) 132.

FIG. 9B is a micrograph 950 showing a magnified region 950 of the LMOF cathode material 750 highly saturated with SPE 132 material. As an example, an LMOF active particle 960 is shown surrrounded by SPE 970 (the white material in the micrograph 950). This enables very good adhesion and high conductivity to the device. It is believed that the prior art does not disclose LMOF saturated with an SPE 970 material. This novel saturation enables high capacity devices that use SPE 132.

Figure 10C:
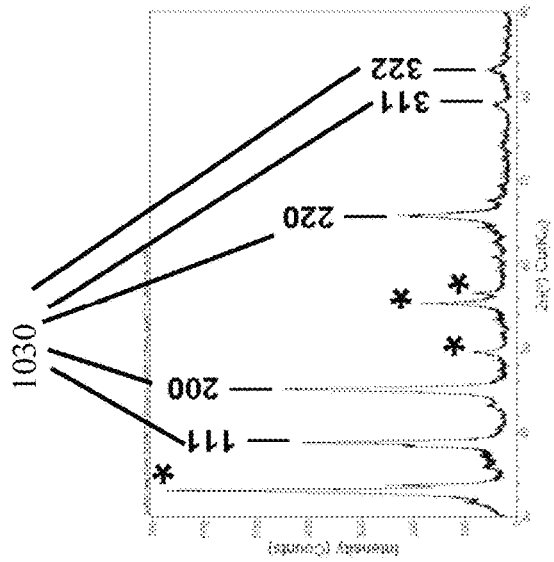
FIG. 10C is an X-Ray Diffraction Spectrum of the Synthesized LMOF cathode powder material with a different 2-theta range than FIG. 10A.
Figure 10B:
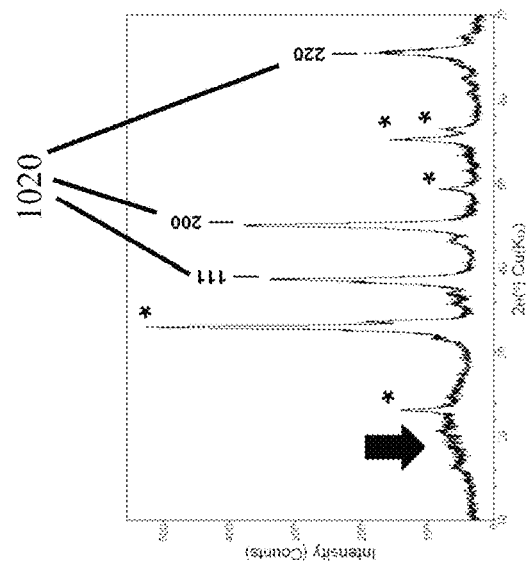
FIG. 10B is an X-Ray Diffraction Spectrum of the Synthesized LMOF cathode powder as formulated with a binder, a Solid Polymer Electrolyte, and conductive additive materials.
Figure 10A:
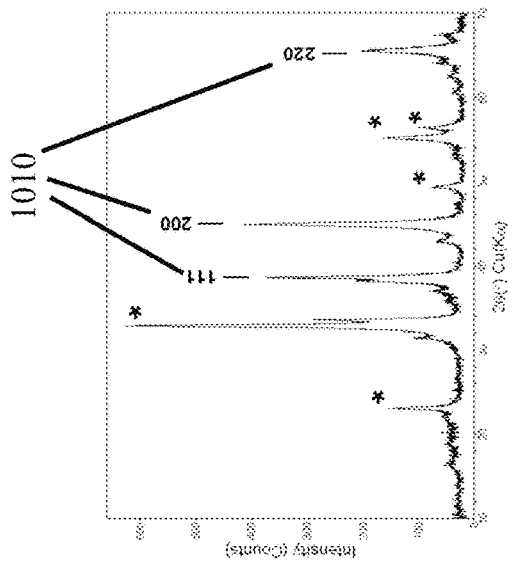
FIG. 10A is an X-Ray Diffraction Spectrum of a Synthesized LMOF cathode powder material.

FIG. 10A illustrates the X-Ray Diffraction spectrum of the LMOF Active Powder Material between 10 and 70 2-theta degrees. Multiple lattice peaks 1010 are representative of the LMOF structure describe herein and FIG. 10A displays the following lattice peaks in the range shown: 111, 200, 220. At least 4 peaks, as indicated with *s, were also observed in the spectrum.

FIG. 10B illustrates the X-Ray Diffraction spectrum of the LMOF Active Powder Material between 10 and 70 2-theta degrees when prepared with the following formulation: active LMOF material (70%) with solid polymer electrolyte (SPE; 15%), conductive additive (carbon black; 10%) and binder (PVDF, polyvinylidene fluoride; 5%). Multiple lattice peaks 1020 are representative of the LMOF structure describe herein and FIG. 10B displays the following lattice peaks in the range shown: 111, 200, 220. At least 4 peaks, as indicated with *s, were also observed in the spectrum. It is thought that the broadened amorphous peak area indicated with the large arrow is due to the stacking aggregation nature of the mixture (e.g, from the stacking/aggregation effect of carbon conductive additives on the 002 lattice intensity).

FIG. 10C illustrates the X-Ray Diffraction spectrum of the LMOF Active Powder Material between 30 and 90 2-theta degrees. Multiple lattice peaks 1020 are representative of the LMOF structure describe herein and FIG. 10C displays the following lattice peaks in the range shown: 111, 200, 220, 311 and 322. At least 4 peaks, as indicated with *s, were also observed in the spectrum.

The multiple lattice peaks (1010, 1020, 1030) have been previously associated, with this material but the formulation of the material in the present invention has much sharper peaks (1010, 1020, 1030) then the peaks previously known—possibly indicating a more electrochemically stable composition of matter, or LMOF species. Additionally, it is thought that the peaks identified with the "*" indicate novel phases of this composition of matter.

While Lithium Manganese Oxyfluoride is synthesized using known materials and solid state reaction processes, using unique parameters results in the crystal structure of the current high capacity LMOF cathode. For example, Lithium Flouride (LiF), Dilithium Oxide (Li$_2$O), and Lithium Manganese DiOxide (LiMnO$_2$) are ball milled together at the correct temperature to cause the reaction:

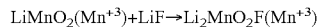

$$\text{LiMnO}_2(\text{Mn}^{+3}) + \text{LiF} \rightarrow \text{Li}_2\text{MnO}_2\text{F}(\text{Mn}^{+3})$$

In one embodiment, there is 9 hours of ball milling at 650 revolutions per minute (RPM) with intervals of 15 minutes of milling and 10 minutes of rest followed by 6 hours of ball milling at 650 revolutions per minute (RPM) with intervals of 5 minutes of milling and 10 minutes of rest.

Figure 11:
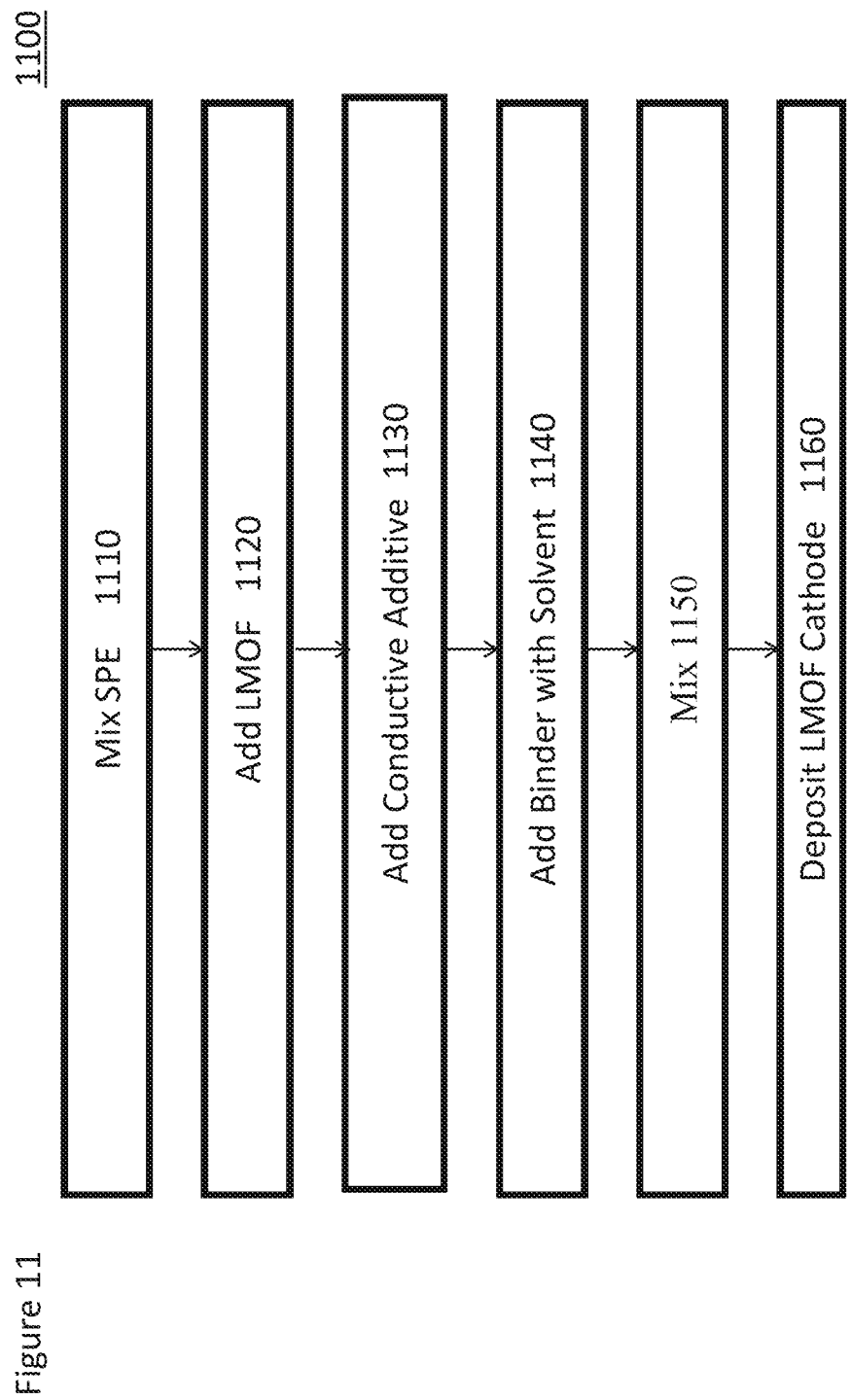
FIG. 11 is a flow chart showing a process for making the novel LMOF cathode material.

FIG. 11 is a flow chart showing a process 1000 for making the novel LMOF cathode material 750.

In step 1110 of the process 1100, the solid polymer electrolyte (SPE) is made. In some embodiments, the SPE is made by mixing a structural polymer component like polycaprolactone (PCl) with a lithium conductive plasticizer material like succinonitrile (SN) and a lithium containing salt compound like Lithium bis(trifluoromethanesulfonyl) imide (LiTFSI). In some embodiments, the ratio of PCl to SN is 2 to 4 (PCl) to 1 (SN). In other embodiments, the ratio of PCL to SN is 3 to 1. In some embodiments, a high vapor pressure organic solvent like acetonitrile or hexafluoro-2-propanol may be added to promote homogeneity of the mixture. The solvent evaporates and does not appear in the final mixture. In some embodiments, the ratio of solid components of the SPE mixture to liquid solvent component of the mixture is 3 (solid) to 1(solvent).

In some embodiments, the SPE makes up between 7.5 percent and 20 percent by mass of the total LMOF cathode material 750.

The SPE lowers the impedance of the cathode material 750.

Other materials used for the SPE component include but are not limited to commonly used SPE materials.

In step 1120 of the procedure 1100 the LMOF is added. In a preferred embodiment, the LMOF comprises between 55 percent and 85 percent by mass of the cathode material 750.

In some embodiments, step 1130 adds a conductive additive to the cathode material composition of matter 750. When added, the conductive additive comprises between 5 percent and 15 percent by mass of the cathode material 750.

The function of the conductive material is to further lower the impedance of the cathode, e.g. (180, 250).

In some embodiments, the conductive material is carbon black. Other conductive materials include but are not limited to carbon Super P, acetylene black, activated carbon, or any other suitable conductive promoting and cell-failure suppressing, sub-micron material which can be homogenized in the system.

In some embodiments, step 1140 adds a binder to the cathode material composition of matter 750. When added, the binder comprises between 4 percent and 10 percent by mass of the cathode material 750. At this step or any steps prior to step 1150, a high vapor pressure solvent is added to the mixture to enhance homogeneity of the mixture. One embodiment utilizes N-Methyl-2-pyrrolidone (NMP) as the solvent.

The function of the binder is to cathode material composition of matter 750 together.

Binder materials include but are not limited to PVDF (polyvinylidene fluoride), SBR (styrene-butadiene), SBR+ CMC (carboxy-methyl cellulose).

In step 1150 of the process 1100 the components are mixed together. Known methods of mixing can be used, including but not limited to: mechanical stirring, vortex mixing, and sonication.

Step 1160 is the deposition of the cathode material composition of matter 750. As stated above, known methods of deposition are used, particularly those methods used for deposition of slurry materials. Deposition methods include but are not limited to: pouring, pipette, thin coat, lamination on a heated metal foil sheet (e.g. with a doctor blade), and/or drop casting on a metal foil or other substrate or electrolyte followed by integration into the rest of the energy storage device (e.g., connection to the SPE electrolyte).

Figure 12B:
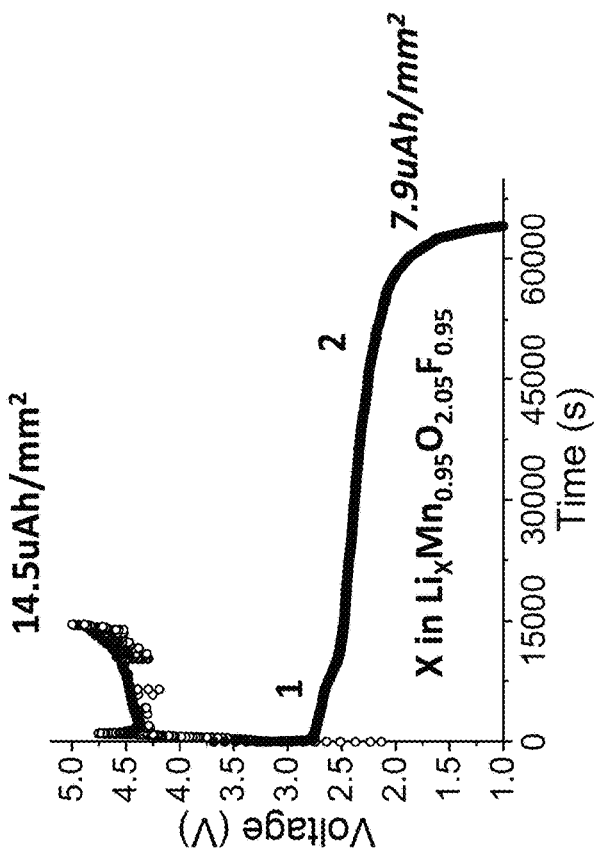
FIG. 12B is cycle 19 from the full cell displayed in FIG. 12A—where both the charge and discharge voltage vs. time curves are displayed—with the approximate Li-loading of composite anode on the charge curve and the approximate Li-loading of the LMOF cathode on the discharge curve.
Figure 12A:
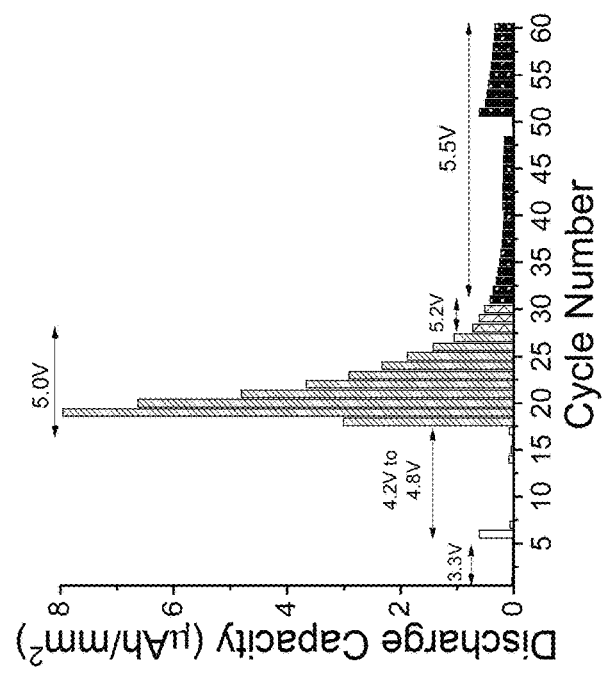
FIG. 12A is a bar plot of the discharge capacity with extended cycling of an LMOF/SPE/3D Si Anode Full Cell with upper charge voltage limits displayed.

FIG. 12A illustrates the discharge capacity of a full microbattery cell, e.g. as shown in FIG. 2, for the first 60 cycles. The associated upper charge voltage limits (shown above horizontal "arrows") for each electrochemical discharge are shown above each group of bar plots. For this full cell, an enlarged cathode area was used (11.2 mm$^2$) in comparison to the 1 mm$^2$ 3D trench which contains the 0.5 mm×0.5 mm activated 3D textured center portion described in prior examples. Charge cycling conditions range from 5 to 150 uA of applied current with a preferred embodiment between 20 uA and 115 uA. Discharge applied currents can range from 1 uA to 20 uA with a preferred range between 3 and 10 uA. The progressive increase in upper charge voltage limit enables and is enabled by a higher Open Circuit Potential (OCP) in the system, as realized by the formation of the composite anode described above. In the present case, charging the cell to 5.0V after initial lower-voltage cycling enables extremely high discharge capacity of 7.9 uAh/mm$^2$ (when normalized to the area of the LMOF cathode in the system).

FIG. 12B illustrates the charge and discharge curves of voltage vs time for cycle 19 (with a charge capacity of 14.5 uAh/mm$^2$ and discharge capacity of 7.9 uAh/mm$^2$), as displayed in FIG. 12A. The charge cycle was conducted with 115 uA of applied current and the charge was stopped at 5.0V—yielding 14.5 uAh/mm$^2$ capacity. The discharge cycle was performed with 5 uA of applied current and displays two distinct regions with different slopes (1) and (2), where the general regions also correspond to the approximate relative ratio of Lithium inside the LMOF compound as defined by the approximate formula: X in Li$_x$Mn$_{0.95}$O$_{2.05}$F$_{0.95}$.

It is important to note that the use of the relatively larger (11.2 mm$^2$) LMOF cathode compared with the relatively small area of the active anode (0.5 mm×0.5 mm) illustrates the beneficial impact on the full cell system when an excess source of mobile Lithium is present. Hence, due to the excess source of Lithium via the large areal cathode (loading) used, an effective, low impedance composite anode is formed during initial cycling—where upon formation there remains enough mobile Lithium in the system to sustainably and reversibly cycle many times. Hence, future application and higher performance development of this type of charge storage device may entail embodiments which increase the source of mobile lithium in the system and/or utilize methods such as pre-lithiation (e.g., using sacrificial lithium metal prior to full cell assembly) in order to prevent the irreversible consumption of mobile lithium in the system to form the above described bi-layer/composite anode and therefore promote the overall capacity performance of the full cell without the irreversible consumption of the LMOF based Lithium.

Figure 13B:
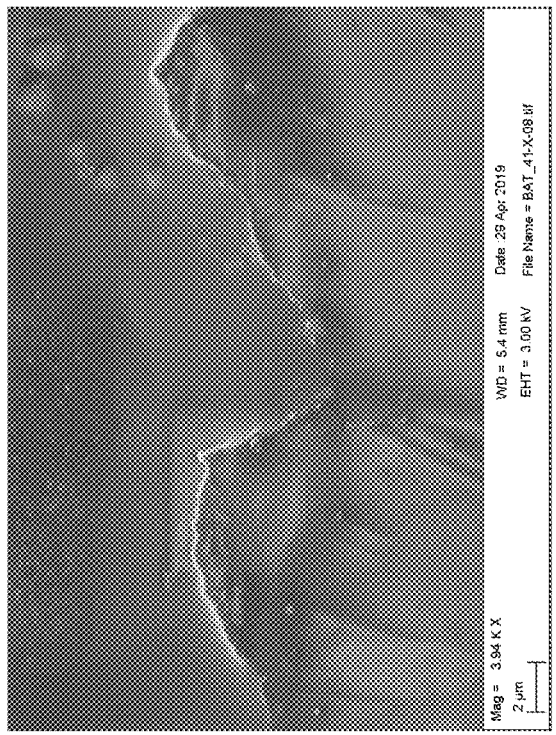
FIG. 13B is a cross section high magnification micrograph illustrating the seamless interface between the PANI containing anode material and the 3D textured Si substrate.
Figure 13A:
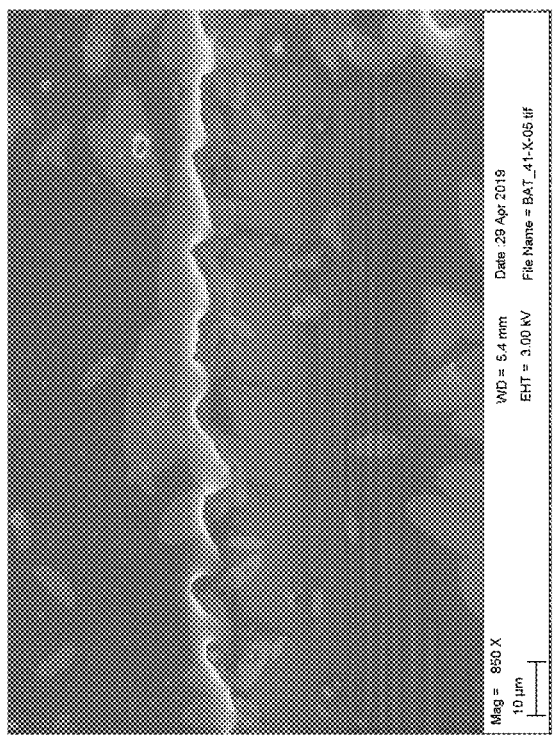
FIG. 13A is a cross section micrograph illustrating the seamless interface between the PANI containing anode material and the 3D textured Si substrate.

FIG. 13A is a micrograph 1310 illustrating a SEM Cross sections of 3D laser textured Si anode materials at the base of a 3D trench where the adhesion between the 3D textured silicon substrate is seamless with the composite polymer/LiTFSI-PANI anode material attached to it.

FIG. 13B is a magnified micrograph 1320 illustrating a SEM Cross sections of 3D laser textured Si anode materials at the base of a 3D trench where the adhesion between the 3D textured silicon substrate is seamless with the composite polymer/LiTFSI-PANI anode material attached to it.

FIGS. 13A and 13B illustrate high adhesion between the 3D laser textured Silicon substrate and the anode materials deposited onto the textured substrate—where such an observation supports the combined materials as viable, low impedance and high performance anode materials for energy storage devices.

Figure 14A:
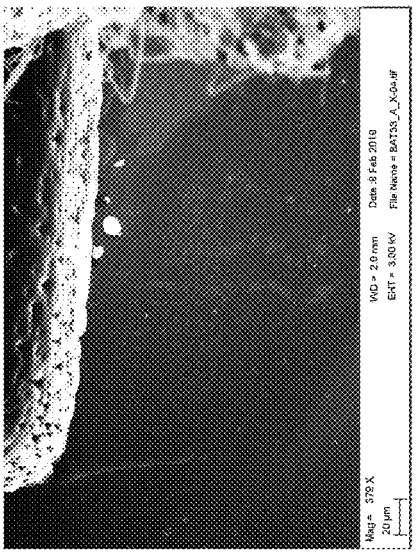
FIG. 14A is a cross section micrograph showing the Silicon area below the base of the 3D square trench in the present invention, where porous regions are observable due to the laser ablation process.

FIG. 14A is a micrograph 1410 illustrating the effect that the laser ablation technique in the present invention has on creating porosity in the depths of a crystalline high boron doped (e.g., 10e19) silicon wafer.

Figure 14B:
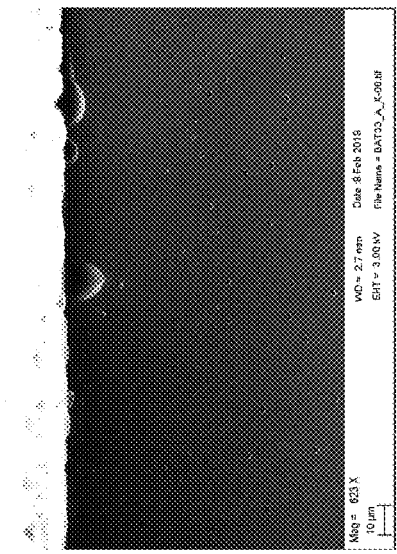
FIG. 14B is a cross section micrograph showing the Silicon area below the base of the 3D square trench in the present invention, where porous regions are observable due to the laser ablation process.

FIG. 14B is a micrograph 1420 illustrating the effect that the laser ablation technique in the present invention has on creating porosity in the depths of a crystalline high boron doped (e.g., 10e19) silicon wafer.

Figure 14C:
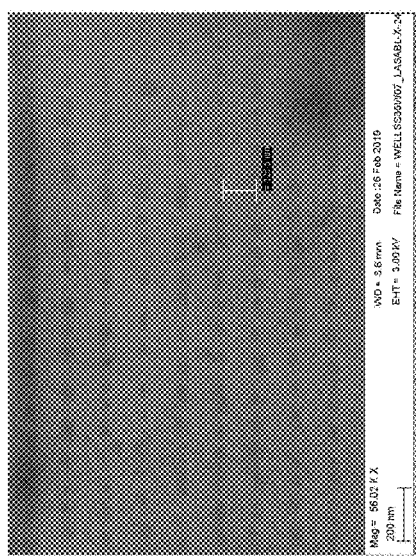
FIG. 14C is a cross section high magnification micrograph illustrating the ordered rows of porosity in the bulk silicon substrate, which result from the laser ablation process in the current invention.

FIG. 14C is a micrograph 1430 illustrating a cross section high magnification micrograph illustrating the ordered rows of porosity in the bulk silicon substrate, which result from the laser ablation process in the current invention.

Evidence of the formation of porosity in a high Boron doped (~10e19) Silicon (observed below base of 3D Trench) Upon Laser Ablation implies that the novel 3D texturing of silicon substrates may also be a viable method to create porous type silicon in high boron doped/p+ type Silicon wafers. Such a method (in or not in conjunction with the 3D Si texturing method shown in the present invention) is a potential method to increase the overall surface area as well as spatially-compensating voids or pores within the Silicon substrate—which decreases the mechanical stress caused on the silicon system as lithium is integrated into and out of the silicon substrate and creates massive (e.g., up to 400%) changes in the volume of the substrate—thereby increasing performance of the energy storage device via increased energy capacity and longer cyclability.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. For example, the semiconductor devices, structures, and methods disclosed in accordance with embodiments of the present invention can be employed in applications, hardware, and/or electronic systems. Suitable hardware and systems for implementing embodiments of the invention may include, but are not limited to, personal computers, communication networks, electronic commerce systems, portable communications devices (e.g., cell and smart phones), solid-state media storage devices, expert and artificial intelligence systems, functional circuitry, etc. Systems and hardware incorporating the semiconductor devices are contemplated embodiments of the invention.

The terminology used herein was chosen to explain the principles of the embodiments and the practical application or technical improvement over technologies found in the marketplace or to otherwise enable others of ordinary skill in the art to understand the embodiments disclosed herein. Devices, components, elements, features, apparatus, systems, structures, techniques, and methods described with different terminology that perform substantially the same function, work in the substantial the same way, have substantially the same use, and/or perform the similar steps are contemplated as embodiments of this invention.

We claim:

1. A composition of matter comprising:
a LMOF electrode made of Lithium Manganese Oxyfluoride (LMOF), with a surface;
a single layer separator adhering to the surface, the separator being a dielectric that is conductive for Lithium ions but not electrons, the separator having a separator top side and a separator bottom side; and
a solid polymer electrolyte (SPE),
wherein:
the SPE saturates the LMOF electrode so that LMOF is between 55 percent and 85 percent by mass of a composition of the LMOF electrode and the SPE is between 7.5 percent and 20 percent by mass of the composition of the LMOF electrode,
the SPE saturates the separator so that the SPE resides both on the separator top side and the separator bottom side so that the SPE residing on the separator top side contacts the surface, and
the LMOF exhibits X-Ray Diffraction spectrum peaks between twenty-two and twenty-four 2-theta degrees, between forty-eight and fifty 2-theta degrees, between fifty-four and fifty-six 2-theta degrees, and between fifty-six and fifty-eight 2-theta degrees.

2. The composition, as in claim 1, where the SPE is comprised of a polymer, a plasticizer and a Lithium containing salt.

3. The composition, as in claim 2, where the polymer is polycaprolactone (PCl), the plasticizer is succinonitrile (SN) and the Lithium containing salt is Lithium bis(trifluoromethanesulfonyl)imide (LiTFSI).

4. The composition, as in claim 3, where a ratio of PCl to SN is between 2 and 4.

5. The composition, as in claim 1, where the SPE comprises one of each of the following:
i. a polymer material being one of the following: poly(ethylene oxide) (PEO), poly(propylene oxide) (PPO), Poly(dimethylsiloxane), Poly(vinyl chloride), Polycaprolactone (PCl),
ii. a lithium containing salt being one of the following: lithium hexafluorophosphate, lithium perchlorate, lithium trifluoromethanesulfonate, lithium fluoride, LiBF4, lithium chloride, lithium phosphate compounds, lithium bromide compounds, and Lithium bis(trifluoromethanesulfonyl)imide (LiTFSI), LiDFOB (lithium difluoro(oxalato)borate), LiBOB (lithium bis(oxalato)borate), and
iii. a plasticizer material being one of the following: succinonitrile (SN), poly(ethylene glycol) (PEG), aprotic organic solvents, dimethylsulfoxide (DMSO).

6. The composition, as in claim 1, further comprising a conductive material that is between 5 percent and 15 percent by mass of the composition of the LMOF electrode.

7. The composition, as in claim 6, where the conductive material is one or more of the following: carbon black, carbon Super P, acetylene black, activated carbon, and/or a sub-micron size material.

8. The composition, as in claim 6, further comprising a binder that is between 4 percent and 10 percent by mass of the composition of the LMOF electrode.

9. A composition matter of an energy storage device comprising:
   a cathode made of Lithium Manganese Oxyfluoride (LMOF), yielding the approximate stoichiometry of Li2MnO2F, the cathode having a surface;
   a single layer separator adhering to the surface, the separator being a dielectric that is conductive for Lithium ions but not electrons, the separator having a separator top side and a separator bottom side; and
   a solid polymer electrolyte (SPE),
   wherein:
      the SPE saturates the LMOF so that the LMOF is between 55 percent and 85 percent by mass of the cathode and the SPE is between 7.5 percent and 20 percent by mass of the cathode,
      the SPE saturates the separator so that the SPE resides both on the separator top side and the separator bottom side and so that the SPE residing on the separator top side contacts the surface, and
      the LMOF exhibits X-Ray Diffraction spectrum peaks between twenty-two and twenty-four 2-theta degrees, between forty-eight and fifty 2-theta degrees, between fifty-four and fifty-six 2-theta degrees, and between fifty-six and fifty-eight 2-theta degrees.

10. The composition, as in claim 9, where the SPE is comprised of a polymer, a plasticizer, and a lithium containing salt.

11. The composition, as in claim 10, where the polymer is polycaprolactone (PCl), the plasticizer is succinonitrile (SN), and the lithium containing salt is Lithium bis(trifluoroinethanesulfonyl)imide (LiTFSI).

12. The composition, as in claim 11, where a ratio of PCl to SN is between 2 and 4.

13. The composition, as in claim 9, where the SPE comprises one of each of the following:
   i. a polymer material being one of the following: poly (ethylene oxide) (PEO), poly(propylene oxide) (PPO), Poly(dimethylsiloxane), Poly(vinyl chloride), Polycaprolactone,
   ii. a lithium salt being one of the following: lithium hexafluorophosphate, lithium perchlorate, lithium trifluoromethanesulfonate, lithium fluoride, LiBF4, lithium chloride, lithium phosphate compounds, lithium bromide compounds, and Lithium bis(trifluoromethanesulfonyl)imide (LiTFSI), LiDFOB (lithium difluoro(oxalato)borate), LiBOB (lithium bis(oxalato) borate), and
   iii. a plasticizer material being one of the following: succinonitrile, poly(ethylene glycol) (PEG), aprotic organic solvents, dimethylsulfoxide (DMSO).

14. The composition, as in claim 9, further comprising a conductive material, where the conductive material is between 5 percent and 15 percent by mass of the cathode.

15. The composition, as in claim 14, where the conductive material is one or more of the following: carbon black, carbon Super P, acetylene black, activated carbon, and a sub-micron material.

16. The composition, as in claim 14, further comprising a binder that is between 4 percent and 10 percent by mass of the cathode.

* * * * *